United States Patent
Vance (12)

(10) Patent No.: US 6,250,701 B1
(45) Date of Patent: Jun. 26, 2001

(54) INTERIOR EXTENSION WITH FLOATING CORNERS

(75) Inventor: Dennis R. Vance, Edwardsburg, MI (US)

(73) Assignee: ASV Plastics, Inc., Elkhart, IN (US)

( * ) Notice: Subject to any disclaimer, the term of this patent is extended or adjusted under 35 U.S.C. 154(b) by 0 days.

(21) Appl. No.: 09/067,636

(22) Filed: Apr. 28, 1998

(51) Int. Cl.$^7$ ........................................... B60P 3/32
(52) U.S. Cl. ..................... 296/26.01; 296/172; 296/176; 296/26.13; 296/26.14
(58) Field of Search .................................... 296/165, 172, 296/175, 176, 26.01, 26.1, 26.11, 26.12, 26.13, 26.14, 26.15; 52/64, 69, 70, 71

(56) References Cited

U.S. PATENT DOCUMENTS

| | | | |
|---|---|---|---|
| 2,132,409 | 10/1938 | Gedeon | 296/23 |
| 2,484,312 | 10/1949 | Rebours | 296/23 |
| 2,831,722 | 4/1958 | Hanson et al. | 296/23 |
| 2,837,778 | 6/1958 | Kern | 20/2 |
| 2,913,775 | 11/1959 | Sailor | 20/2 |
| 3,070,850 | 1/1963 | McClure, Sr. | 20/2 |
| 3,271,065 | 9/1966 | Scuris | 296/23 |
| 3,408,102 | 10/1968 | McNamee | 296/23 |
| 3,596,416 | 8/1971 | Hojka | 52/64 |
| 3,598,441 * | 8/1971 | Damiani | 296/164 |
| 3,778,100 * | 12/1973 | Dillard | 296/164 |
| 4,109,427 * | 8/1978 | O'Brian et al. | 52/70 |
| 4,114,942 | 9/1978 | Greiner | 296/23 |
| 4,856,843 | 8/1989 | Elliot | 296/181 |
| 4,930,837 | 6/1990 | Marsh et al. | 296/165 |
| 4,960,299 | 10/1990 | Steadman | 296/26 |
| 5,061,006 | 10/1991 | Baughman | 296/164 |
| 5,237,782 | 8/1993 | Cooper | 52/67 |
| 5,248,180 | 9/1993 | Hussaini | 296/171 |
| 5,567,003 | 10/1996 | Gill | 296/173 |
| 5,673,962 * | 10/1997 | Maieli et al. | 296/26 |
| 5,772,270 * | 6/1998 | Hanser et al. | 296/26 |

FOREIGN PATENT DOCUMENTS

| | | |
|---|---|---|
| 2 617 449 | 7/1987 | (FR) . |
| 376998 | 8/1932 | (GB) . |
| 2 171 365 | 2/1985 | (GB) . |

* cited by examiner

Primary Examiner—D. Glenn Dayoan
Assistant Examiner—Lori L. Coletta
(74) Attorney, Agent, or Firm—Baker & Daniels

(57) ABSTRACT

The present invention involves an extension unit for a structure, such as a recreational vehicle or manufactured housing component. The recreational vehicle or manufactured housing component structure has an exterior wall, and the extension unit provides additional interior space for the structure when in a deployed position. The extension unit comprises a floor, a roof, a first wall extending between the floor and roof, a second wall operably coupled to the first wall and extending between the floor and roof, a pivotal connection linking the first wall and one of the second wall and exterior wall, and a biasing mechanism for biasing the first wall into the other of the second wall and exterior wall in the deployed condition. The pivotal connection links the first wall to the second wall, while the biasing mechanism biases an edge of the first wall into the exterior wall in both the deployed position and the retracted position. The biasing mechanism includes a coil spring operably coupled to the first side wall. The first side wall includes a side floor portion, with the side floor portion extending out of the floor in the deployed position. A drive shaft, operably coupled to the floor, carries a motor, and the motor is connected to the structure to move the floor, and hence the entire extension unit, relative to the structure. The roof comprises a hinged portion and a slidable portion, with the slidable portion being operably coupled to a guide rail within the structure and the hinged portion including a seal which abuts the slidable portion in the deployed position. In a second embodiment of the invention, the pivotal connection links the first wall to the exterior wall, and the biasing mechanism biases an edge of the first wall into the second wall in both the deployed position and the retracted position. In either embodiment, the pivotal connection includes a sealing mechanism for forming a seal along the pivotal connection in both the deployed position and the retracted position.

41 Claims, 6 Drawing Sheets

FIG_1

FIG_2

FIG_3

FIG_4

FIG_9

FIG_10

FIG_11

FIG_12

FIG_13

FIG_14

FIG_15

FIG_16

FIG_17

INTERIOR EXTENSION WITH FLOATING CORNERS

BACKGROUND OF THE INVENTION

1. Field of the Invention

The present invention relates generally to movable extension units for creating additional interior space within a structure providing living space. More particularly, the invention relates to movable extension units for recreational vehicles, manufactured housing, and specialty trailers.

2. Description of the Related Art

Physical dimensional restrictions limit the amount of interior space within many structures providing living space. For example, recreational vehicles, manufactured housing, and specialty trailer structures are restricted in their width dimension because of space restrictions upon the highways upon which those structures are transported. However, once the recreational vehicle, manufactured housing, or specialty trailer component has completed its transport, either temporarily or permanently, the structure no longer has a width restriction. In fact, the occupants of those structures would prefer to have a greater amount of interior living space.

To accommodate the desire for additional interior space, several different configurations have been employed. One example involves creating a pop-out compartment formed by the extension of side walls from the recreational vehicle. In the side walls' retracted position, the side walls form interior partitions within the vehicle. These interior partitions limit the amount of interior space within the vehicle when the compartment is retracted.

Another example involves a tent camper with a lateral slide-out room. The tent camper includes a camper main body that is pulled in a longitudinal direction by a towing vehicle. A roof, aligned above the camper main body, is movable between a lowered, storage or transport position and a raised, camping or deployed position. The lateral slide-out room, coupled to the camper body, is movable in a lateral direction between a retracted, storage position and an extended, operational position. This allows the lateral slide-out to extend and provide additional living space within the camper. The interior space of the camper is not habitable in the retracted, transport position, the overlap or interior partition of the slide-out side walls within the camper is not an issue.

A further example involves a mobile accommodation structure such as a caravan or motor home with a foldable extension for enlarging the volume of the vehicle. A wall panel is attached to guide rails on the side of the vehicle for pivotal and sliding movement over the vehicle side wall. Another wall panel is only pivotally connected to the side wall, while the middle wall panel is pivotally connected to both other wall panels. The roof of the accommodation structure is hinged on the vehicle roof edge to be able to move from a position overlying the vehicle roof to a position covering the trapezoidal recess formed by the side walls when deployed. The floor is hinged on the floor edge so that it is capable of moving from a position parallel to the vehicle side wall to a position co-planar with the vehicle floor.

Each of these prior structures includes drawbacks in terms of the use and reliability of the extension unit. In most recreational vehicles, the creation of interior partitions in the retracted position diminishes the utility of the extension, as often such interior partitions interfere with the amount of the space within the vehicle during transport, either as living or storage space. The deployment mechanisms, such as the pivotal and sliding connection on the body of a recreational vehicle, require manufacturing complication and expense to create the extension unit. Also, the movable connections of the wall panels with the vehicle require seals to prevent the penetration of moisture and the elements into the interior region. Finally, the difficulty of deploying the additional interior space often involves complex mechanisms requiring application of significant force on the mechanism. However, for convenience of use, units which may be deployed using only the equipment associated with the structure are preferred.

What is needed in the art is an extension unit which provides the desired additional interior space without creating interior partitions, which minimizes leakage points into the interior space, and which accomplishes these goals with a minimal increase in complication and expense.

SUMMARY OF THE INVENTION

The present invention involves an extension unit for a building or vehicle structure with a floating corner biased into the exterior wall of the structure. In the retracted position, the extension unit is deployed flat against the side of the structure, suitable for transport. In the deployed position, the extension unit protrudes from the side of the structure and wall panels press together to create the floating corner. A biasing mechanism maintains the integrity of the floating corner, urging the wall panels together.

One of the panels of the extension unit is pivotally connected to either a second extension unit panel or the structure. That first extension unit panel then forms the floating corner with the other one of the second extension unit panel or structure. Flexible seals are present at the floating corners to prevent the penetration of moisture and debris into the interior of the structure.

The floor and roof of the extension unit may be pulled out and extended to match the outline of the walls of the extension unit. A biasing mechanism links the floor and the structure so that as the extension unit is moved into its deployed position, side portions of the floor are urged from the rectangular floor panel outward to completely cover the bottom of the extension unit. The roof is biased against the side walls and moved upward upon the deployment of the extension unit. In the retracted position, the side portions of the floor fold into the rectangular floor panel while the roof folds down over the side walls.

The floor panel is operatively connected to a shaft which is rotatably coupled to a motor. The shaft can be turned in a first direction to urge the floor panel outwardly and deploy the extension unit. The side portions of the floor, also connected to the side panels of the extension unit, are automatically pivoted outward following the movement of the side panels. The biasing mechanism in the floor is also coupled to the floor side panels to bias the wall side panels into the exterior of the structure. With each end of the wall side panels having a floating seal, the biasing accentuates the sealing created by the flexible seals.

The extension unit forms a trapezoidal additional interior space by having a center wall panel pivotally connected to a pair of side wall panels with floating corners. All three wall panels of the extension unit have windows, so the deployed extension unit provides a walled area, in the contour of a bay window, within the interior of the structure. The deployed floor has support beams extending from the structure which allows the extension unit to be supported off the ground. Also, the deployed roof extends above and over the extension unit, protecting the walls, containing the bay windows, from the elements with an overhang.

The present invention, in one form, involves an extension unit for a structure. The extension unit provides additional interior space for the structure in a deployed position, and comprises two walls, a pivotal connection, and a biasing mechanism. The pivotal connection links a first wall and one of a second wall and the structure's exterior wall, allowing the first and second walls to extend from the structure to create interior space beyond the exterior wall of the structure. The biasing mechanism biases the first wall into the other of the second wall and the exterior wall of the structure in the deployed condition.

The present invention, in another form, involves an extension unit for a structure. The extension unit provides additional interior space for the structure in a deployed position, and comprises a plurality of movable walls and a floor panel. One of the walls is movable to a position which is disposed at an angle relative to the exterior wall of the structure. The plurality of walls define a polygonal region in the deployed position. The floor panel is attached to the one wall. The one wall includes a wall panel and a floor portion, with the floor portion extending transversely from the wall panel. The floor panel and the one wall's floor portion define separate, non-coextensive planar surfaces within the polygonal region.

The present invention, in another form, involves an extension unit for a structure. The extension unit provides additional interior space for the structure in a deployed position, and comprises a plurality of movable walls and a floor panel. One of the walls is movable to a position which is disposed at an angle relative to the exterior wall of the structure. The plurality of walls define a polygonal region in the deployed position. A roof is associated with the walls and includes an inclined portion which is slidable from the structure over the walls. The roof also includes a biased portion extending from the structure above the inclined portion which is arranged to engage the upper surface of the inclined portion.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

The present invention provides a "floating corner" between the side walls of the extension unit and the exterior wall of the structure. The concept of the invention is that not all the corners of the walls of the extension unit and the adjacent exterior walls are required to have a direct linkage. Rather, the corners are continuously in abutment either through a pivotal linkage or a biasing connection, each forming a seal, while allowing for the movement of the walls of the extension unit relative to the structure. Thus, the sealing connection between the edge of the walls of the extension unit and structure "floats" over a range of motion.

Further, while the description below is specifically identified with recreational vehicles in general, many other structures could utilize the arrangement and configuration of the present invention. For example, manufactured housing components are transported over the highways, and have similar width restrictions as recreational vehicles. The occupants of manufactured housing have the same desire for additional interior space as the occupants of recreational vehicles, particularly the additional window exposure offered by the bay window design of the present invention. Recreational vehicles themselves have many varieties, such as motor homes, fifth wheels, tent campers, trailers, etc., which can utilize the present invention. Other structures, such as mobile homes, boats, train compartments, may find the structure of the present invention beneficial. Thus, while the structure of a recreational vehicle is explicitly shown and described in detail below, many other structures can utilize the present invention.

Figure 1:
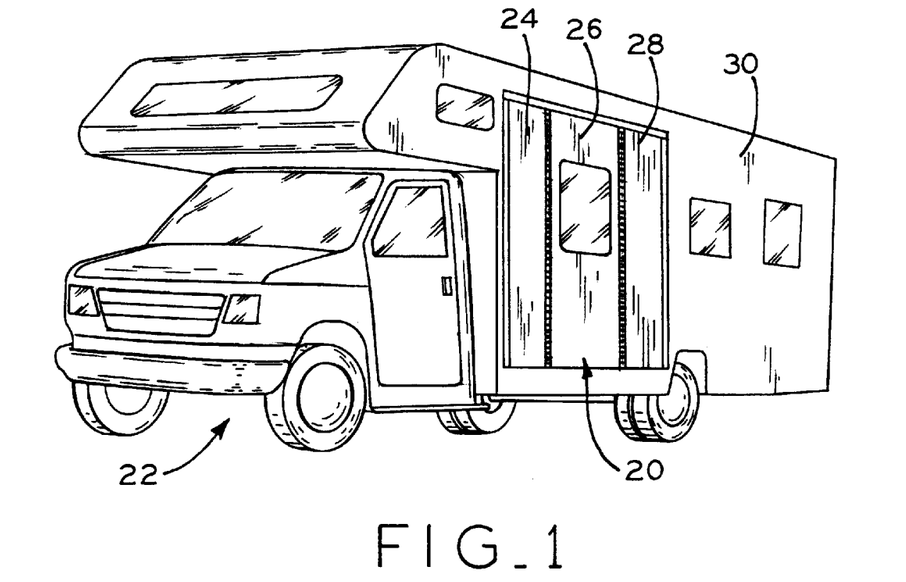
FIG. 1 is a perspective view of a recreational vehicle with the extension unit of the present invention in the retracted position.
Figure 2:
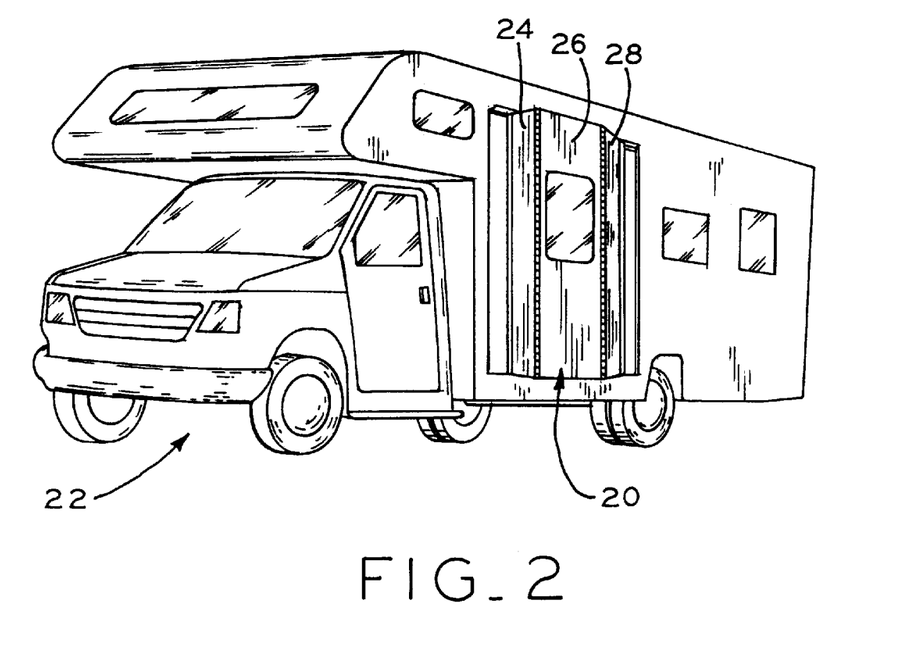
FIG. 2 is a perspective view of a recreational vehicle with the extension unit of the present invention deployed.

FIGS. 1 and 2 show extension unit 20 on recreational vehicle 22. In the retracted position of FIG. 1, side walls 24, 26, and 28 are generally parallel and adjacent to exterior wall 30 of recreational vehicle 22. Extension unit 20 may be deployed, as described in greater detail below, so that center wall panel 26 is parallel to and spaced from exterior wall 30 with side walls 24 and 26 extending at angles between the two.

Figure 16:
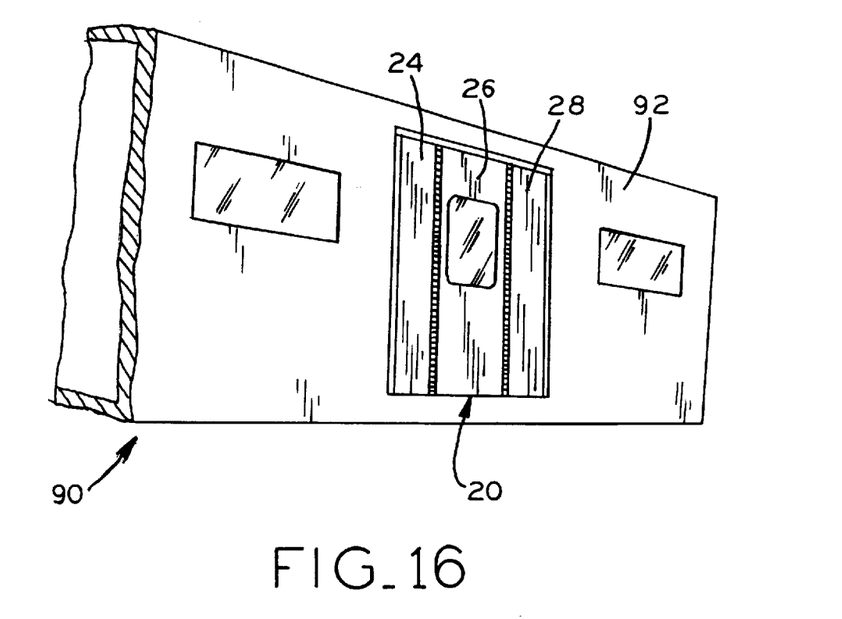
FIG. 16 is a partial view of a housing component with the extension unit of the present invention in the retracted position.
Figure 17:
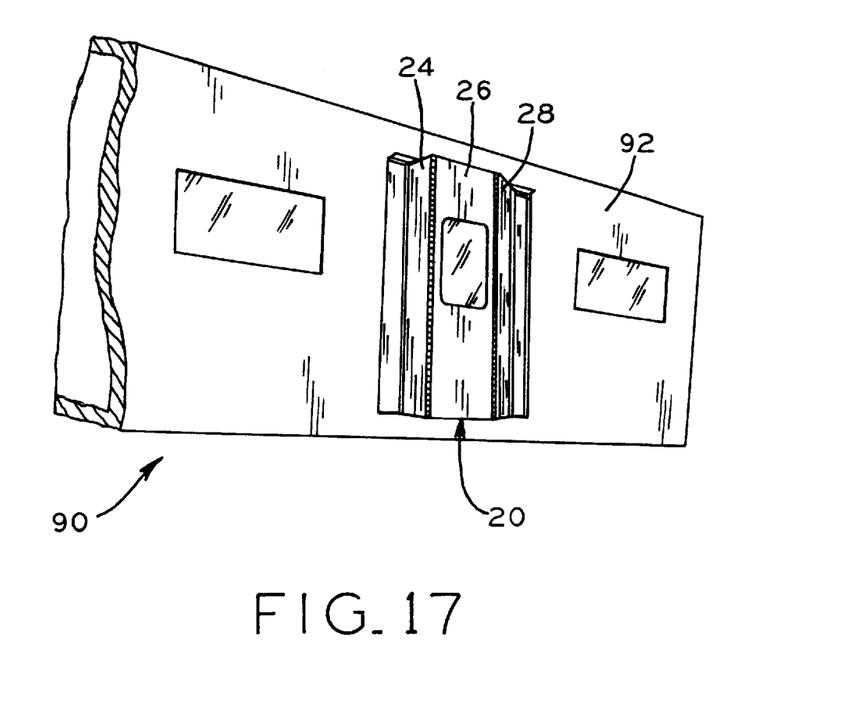
FIG. 17 is a partial view of a housing component with the extension unit of the present invention deployed.

FIGS. 16 and 17 show extension unit 20 on housing component 90. In the retracted position of FIG. 1, side walls 24, 26, and 28 are generally parallel and adjacent to housing frame 92 of housing component 90. Extension unit 20 may be deployed, as described in greater detail below, so that center wall panel 26 is parallel to and spaced from exterior wall 30 with side walls 24 and 28 extending at angles between the two.

Figure 3:
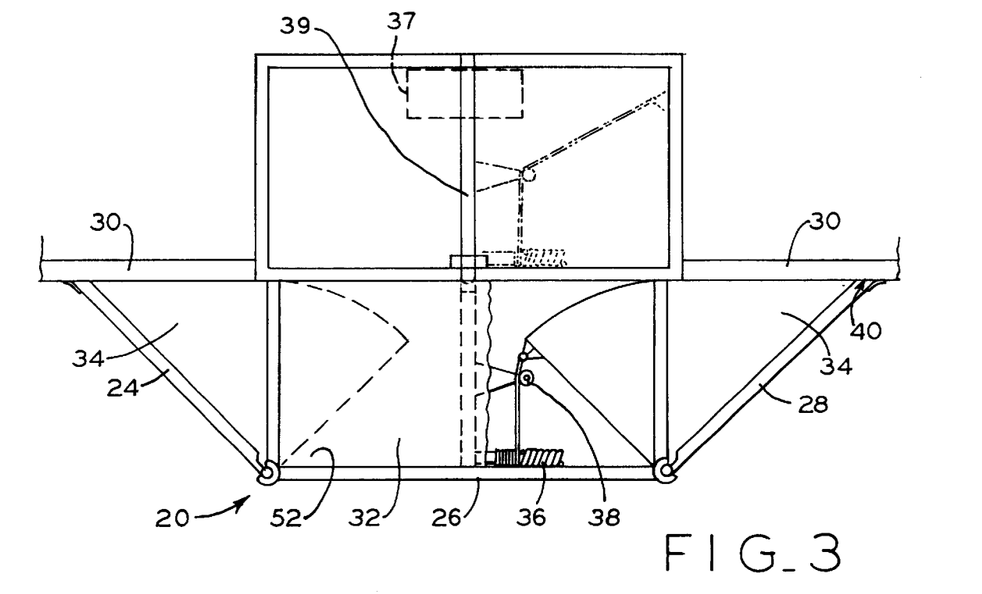
FIG. 3 is a top schematic view of the extension unit floor and walls of present invention.

FIG. 3 shows floor 32 of extension unit 20 in the deployed position, with side walls 24 and 28 biased into exterior wall 30. Each of side walls 24 and 28 are attached to extendable floor 34, which is also pivotally attached to floor 32 at an outer corner. Support beams 31 and 33 are movably disposed on rollers 35 to support floor 32 in the extended, deployed position. Coil spring 36 is attached to extendable floor 34 via pulley 38, so that edge 40 of side wall 28 is urged into contact with exterior wall 30 in the deployed position show in FIG. 3. The location of coil spring 36 in the retracted position is shown in ghost lines in FIG. 3. Floor 32 is operatively connected to shaft 39 which is rotatably coupled to motor 37.

Coil spring 36 acts to bias side wall 28 into abutment with exterior wall 30, although other mechanisms may be used to accomplish this biasing function. For example, a spring type of device may be used to press side wall 28 into abutment with exterior wall 30. In the exemplary embodiment of FIG. 3, coil spring 36 has a configuration similar to that of a common garage door spring. Alternative mechanisms are also possible, such as a radiused track (e.g., FIGS. 9 and 10); hydraulic, pneumatic, or air pressured cylinders, electric screw mechanisms, a hand cranked screw, an eccentric mechanism, an the like.

Figures 6, 8:
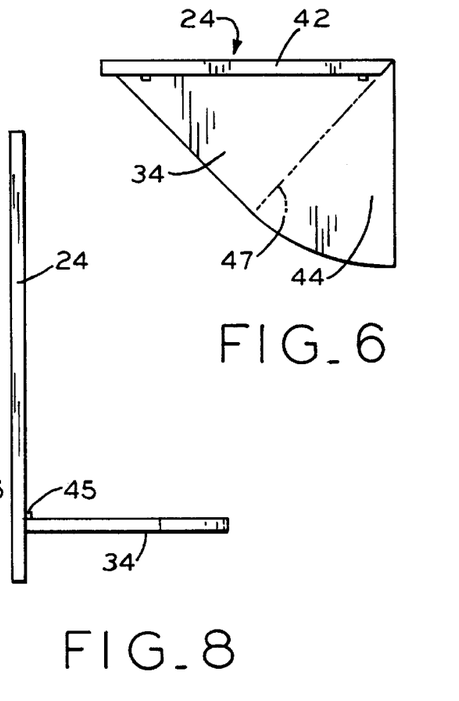
FIG. 6 is a top plan view of a side wall and floor component.
FIG. 8 is a side view of a side wall of FIG. 6.
Figure 7:
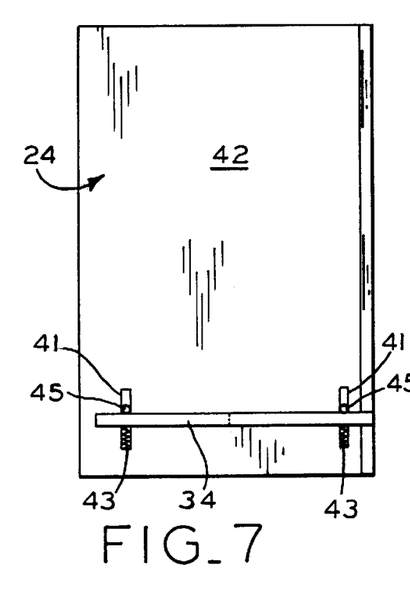
FIG. 7 is a back view of a side wall of FIG. 6.

More detailed views of side wall 24 appear in FIGS. 6–8. Floor extension 34 of side wall 24 provides additional planar surface support within the polygonal region defined by side walls 24, 26, and 28. The invention also includes the use of such a floor extension with other arrangements of side walls for extension units, including units employing side walls which are attached on a guide rail and have a pivotal and sliding engagement. Thus, while the exemplary embodiment discloses the floor extension as used with "floating corner" types of wall panels, the invention is easily adaptable to other structural arrangements which create a non-rectangular polygonal region so that the floor extension and floor panel define separate planar surfaces of the total floor surface for the extension unit.

Side wall 24, in the exemplary embodiment, includes wall panel portion 42 with floor extension 34 extending transversely from wall panel 42 generally in a plane parallel with floor 32 and the floor of recreational vehicle 22. In the deployed position, floor extension 34 provides the only planar support for a portion of the polygonal region defined by extension unit 20. This requires that floor extension 34 at a minimum include planar triangular region 44, although in the exemplary embodiment depicted in FIGS. 3 and 4, the planar support of floor extension 34 continues to wall panel 42. Thus, floor extension 34 is generally triangular except for the arced periphery of region 44.

Alternatively, wall panel 42 may include tracks 41 which house biasing mechanism 43, such as a spring, engaging riders 45 of floor extension 34. With this alternative arrangement, floor extension 34 contains only the triangular region partially defined by line 47. This triangular floor extension may thus initially be disposed above (or below) floor 32 so that when extension unit 20 is in the deployed position, floor extension 34 is biased down (or up) to be approximately coplanar with floor 32. Riders 45 locate floor extension 34 relative to wall panel 42, while biasing mechanism 43 urges floor extension 34 to the appropriate position. Biasing mechanism 43 may be associated with a locking device (not shown) that can secure the horizontal position of floor extension 34.

Figure 4:
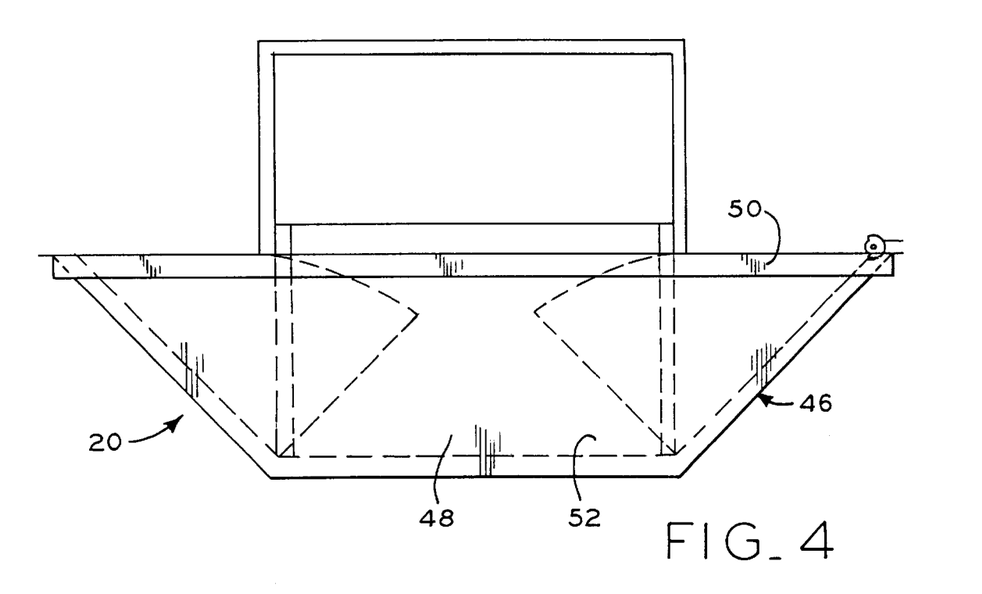
FIG. 4 is a top schematic view of extension unit roof of the present invention.
Figure 5:
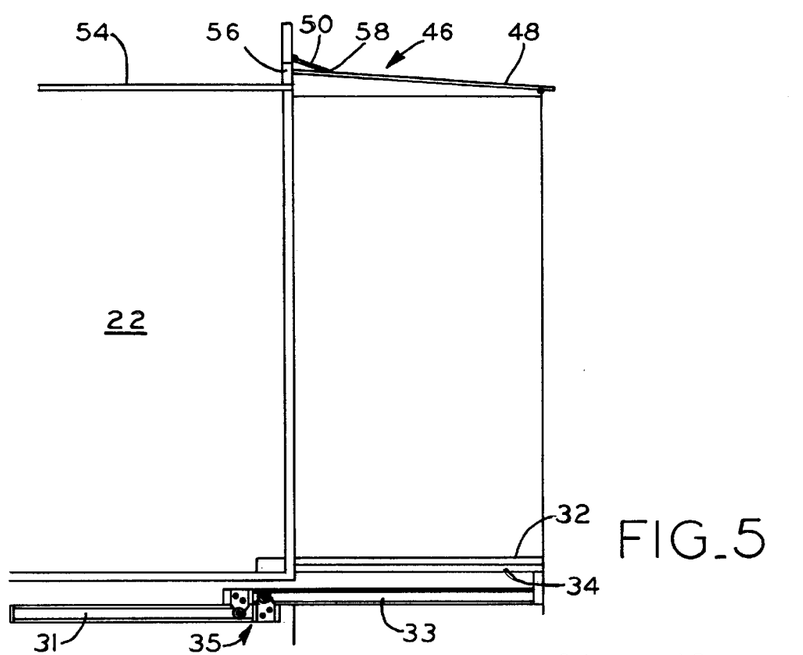
FIG. 5 is a side, sectional view of the extension unit of FIGS. 1 and 2.

FIGS. 4 and 5 show roof 46 of extension unit 20 in the deployed position. Roof 46 includes slidable portion 48 and hinged portion 50 which are positioned over the polygonal region defined by the outer periphery of side walls 24, 26, and 28. In the retracted position (not shown), slidable portion 48 is located within the roof of recreational vehicle 22, with hinged portion 50 projecting downwardly and covering polygonal shaped opening 52. Moved along guide rails 54 of recreational vehicle 22 to the deployed position, slidable portion 48 extends through opening 56 and presses against hinged portion 50. Seal 58 along the edge of hinged portion 50 prevents the penetration of moisture or the elements through opening 56. Hinged portion 50 may include a biasing element, such as a spring, or may rely solely on the force of gravity to maintain sealing between seal edge 58 and the upper surface of slidable portion 48.

One of ordinary skill would also appreciate that the structures described above relating to the floor of the extension unit could also be located proximate the upper portions of the wall panels and thereby provide a ceiling for the interior living space and also provide a roof to extend over the top of the extension unit's wall. In such a configuration, a biasing mechanism could also be arranged to cause the extension to be disposed at an incline so that rain or other debris would be directed off the roof.

Figure 9:
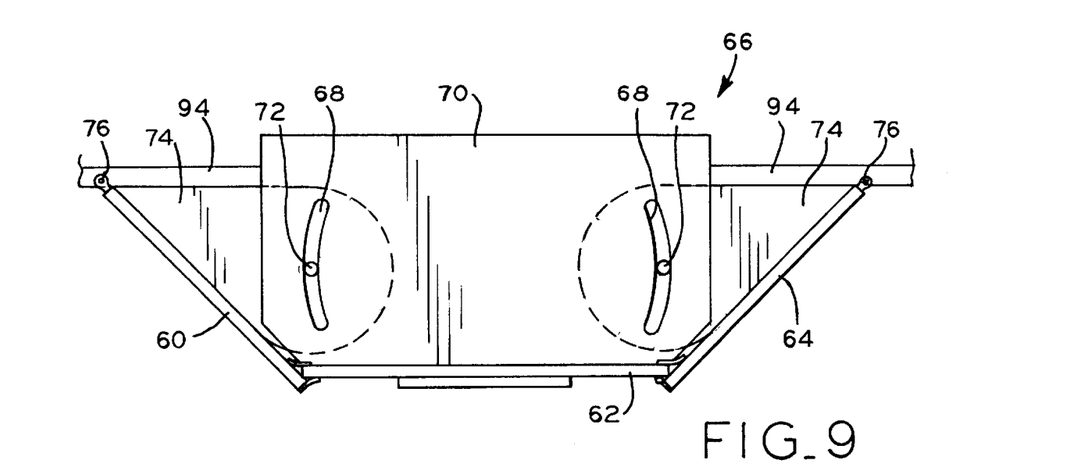
FIG. 9 is a top schematic view of a second embodiment of the extension unit floor and walls of the present invention.
Figure 10:
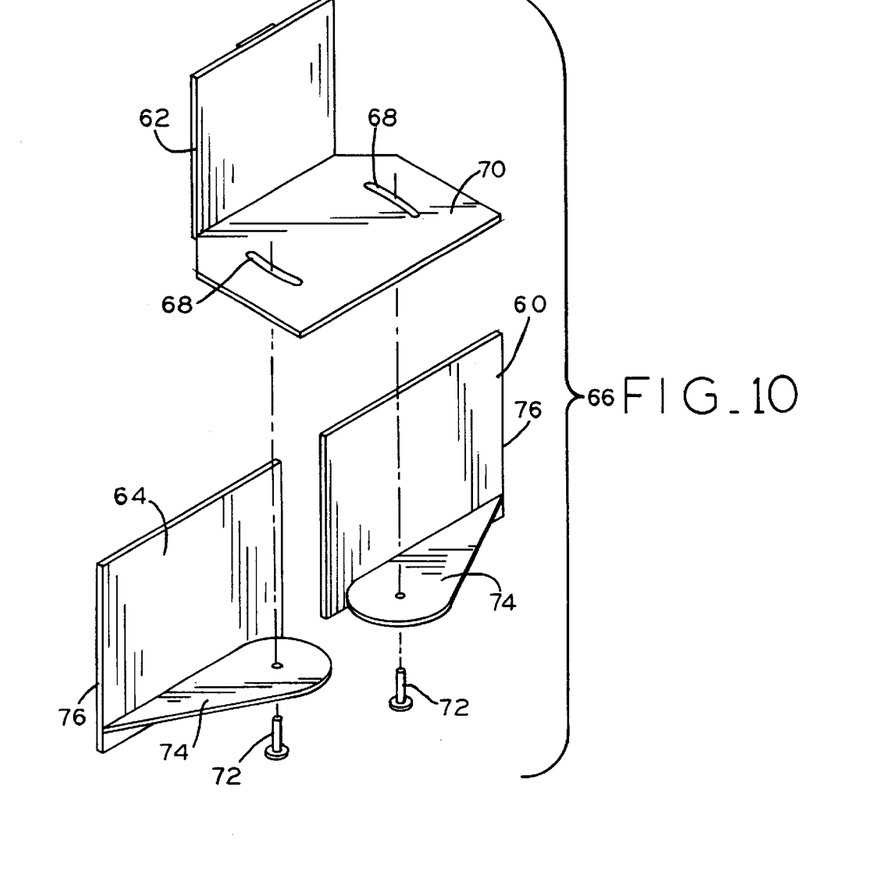
FIG. 10 is an exploded view of the floor and wall components of FIG. 9.

A second embodiment of the invention is shown in FIGS. 9 and 10. In this embodiment, the floating corners are formed between walls 60, 62 and 64 of extension unit 66. Radiused track 68 of floor portion 70 acts to bias walls 60 and 64 relative to wall 62. Pivot pins 72 extend through floor extensions 74 of walls 60 and 64 to engage track 68. Hinged ends 76 of walls 60 and 64 are attached to structure 94, e.g. the exterior wall of recreational vehicles, manufactured housing, and specialty trailers, from which extension 66 extends. When walls 60, 62, and 64 are approximately parallel, e.g. FIG. 10, walls 60 and 64 overlap with wall 62. As wall 62 is urged away from the parallel position, track 68 forces pins 72 to urge floor extensions 74 outward, causing walls 60 and 64 to pivot on hinged ends 76 and creating "floating corners" between the non-hinged ends of walls 60 and 64 and the ends of wall 62. As in the first embodiment, floor extensions 74 form part of the support surface of extension unit 66 which is not covered by floor portion 70. Also, although not shown in FIG. 10, floor extensions 74 may be triangularly shaped and ride within tracks of walls 60 and 64 to act similarly to the alternative embodiment of FIGS. 6–8. While floor extensions 74 are depicted in FIG. 10 as having rounded portions, and floor portion 70 has a trapezoidal shape, one of ordinary skill in this art would appreciate that these arrangements are only a small subset of the possible configurations of the present invention which is disclosed and claimed in this application.

Figure 11:
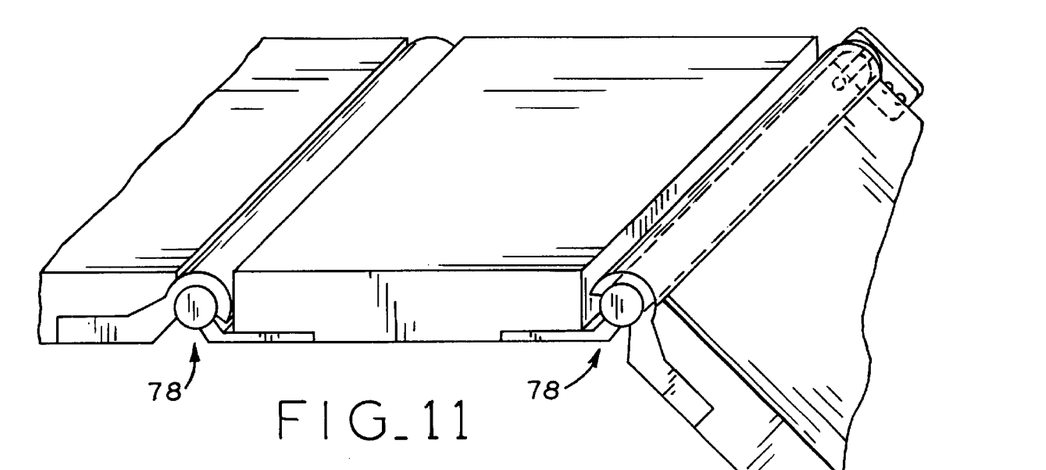
FIG. 11 is a sectional view of a first embodiment of a corner seal of the present invention.
Figure 12:
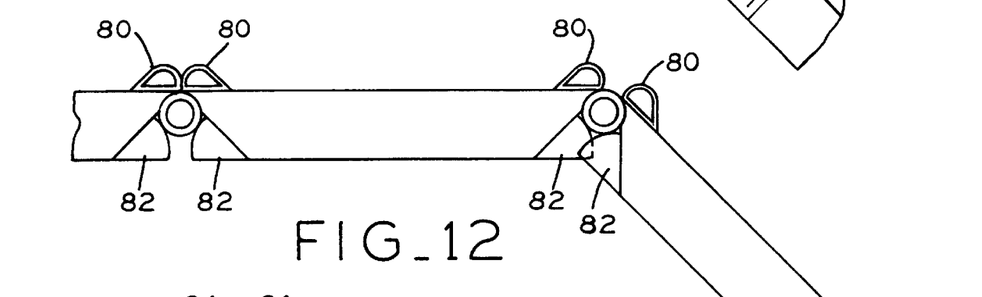
FIG. 12 is a sectional view of a second embodiment of a corner seal of the present invention.
Figure 13:
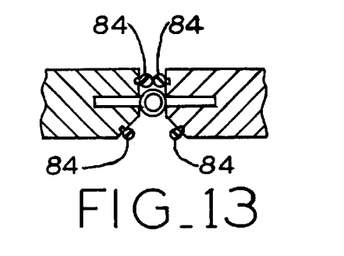
FIG. 13 is a sectional view of a second embodiment of a corner seal of the present invention.
Figure 14:
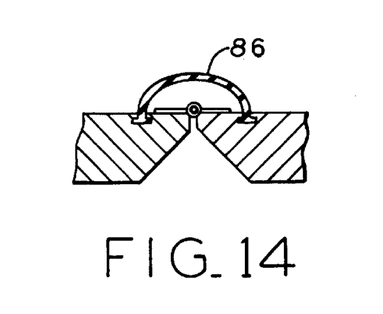
FIG. 14 is a sectional view of a second embodiment of a corner seal of the present invention.
Figure 15:
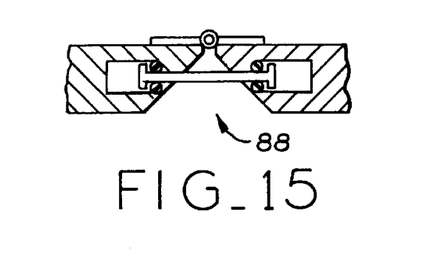
FIG. 15 is a sectional view of a second embodiment of a corner seal of the present invention.

Several different forms of sealing arrangements for the pivotal connection between walls are shown in FIGS. 11–15. FIG. 11 shows ball and joint seal 78 pivotal connection between side walls. FIG. 12 shows a mating bulb arrangement of joints, so that elastomer seal elements 80, 82 are positioned to abut in both the retracted and deployed positions. FIG. 13 shows a double line seal arrangement also providing for elastomer seal elements 84 to be positioned to abut in both the retracted and deployed positions. FIG. 14 shows seal cover 86 arrangement, wherein the seal element completely protects the hinge from outside elements. FIG. 15 shows interior seal arrangement 88, wherein a flexible elastomer is fixed behind the hinge to prevent penetration of air or moisture through the hinge into the interior of extension unit 20.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An extension unit for a structure, the structure having a exterior wall and said extension unit providing additional interior space for the structure in a deployed position, said extension unit comprising:

a first wall operatively associated with the exterior wall;

a second wall operably coupled to said first wall and operatively associated with the exterior wall;

a pivotal connection linking said first wall and one of said second wall and the exterior wall, said pivotal connection allowing said first and second wall to extend from the structure to create interior space beyond the exterior wall of the structure; and biasing means for biasing said first wall into the other of said second wall and the exterior wall in the deployed condition.

2. The extension unit of claim 1 wherein said pivotal connection links said first wall to said second wall, and said biasing means biases an edge of said first wall into the exterior wall of the structure in the retracted position.

3. The extension unit of claim 1 wherein said biasing means includes a spring operably coupled to said first side wall.

4. The extension unit of claim 1 wherein said first side wall includes a side floor portion, said side floor portion extending out of said floor is the deployed position.

5. The extension unit of claim 1 further comprising a floor having a deployed and retracted position, and a drive shaft operably coupled to said floor.

6. The extension unit of claim 5 wherein said drive shaft carries a motor, said motor connected to the structure to move said floor relative to the structure.

7. The extension unit of claim 1 further comprising a roof having a hinged portion and a slidable portion, said roof extendable between a deployed and retracted position.

8. The extension unit of claim 7 wherein said slidable portion is operably coupled to a guide rail within the structure.

9. The extension unit of claim 7 wherein said hinged portion includes a seal which abuts said slidable portion in the deployed position.

10. The extension unit of claim 1 wherein said pivotal connection links said first wall to the exterior wall, and said biasing means biases an edge of said first wall into said second wall in the retracted position.

11. The extension unit of claim 1 wherein said pivotal connection includes sealing means for forming a seal along said pivotal connection in both of the deployed position and the retracted position.

12. A recreational vehicle comprising:

a vehicle body having an exterior wall;

a first wall operatively associated with said exterior wall;

a second wall operably coupled to said first wall and operatively associated with said exterior wall;

a pivotal connection linking said first wall and one of said second wall and said exterior wall, said pivotal connection allowing said first and second wall to extend from said exterior wall to create interior space beyond said vehicle body; and biasing means for biasing said first wall into the other of said second wall and the exterior wall in the deployed condition.

13. A manufactured housing component comprising:

a housing frame having an exterior wall;

a first wall operatively associated with said exterior wall;

a second wall operably coupled to said first wall and operatively associated with said exterior wall;

a pivotal connection linking said first wall and one of said second wall and said exterior wall, said pivotal connection allowing said first and second wall to extend from said exterior wall to create interior space beyond said housing frame; and biasing means for biasing said first wall into the other of said second wall and the exterior wall in the deployed condition.

14. An extension unit for a structure, the structure having a exterior wall and said extension unit providing additional interior space for the structure in a deployed position, said extension unit comprising:

a plurality of movable walls, a first one of said walls movable to a position which is disposed at an angle relative to the exterior wall of the structure, said plurality of walls defining a polygonal region in the deployed position; and a floor with a planar surface attached to one of said plurality of walls;

said first wall including a wall portion and a floor extension portion, said floor extension portion extending transversely from said wall portion, said floor extension portion and said planar surface defining separate, non-coextensive surfaces within said polygonal region.

15. The extension unit of claim 14 wherein said floor extension portion further includes an arced edge surface.

16. The extension unit of claim 14 wherein said wall portion further includes a track with a biasing mechanism, said floor extension portion engaged with said track and movable to a position approximately coplanar with said planar surface.

17. An extension unit for a structure, the structure having a exterior wall and said extension unit providing additional interior space for the structure in a deployed position, said extension unit comprising:

a plurality of movable walls, a first one of said walls movable to a position which is disposed at an angle relative to the exterior wall of the structure, said plurality of walls defining a polygonal region in the deployed position; and a roof associated with said plurality of walls, said roof including an inclined portion slidable from the structure over said plurality of walls, said roof including a hinged portion extending from the structure above said inclined portion and arranged to engage the upper surface of said inclined portion.

18. The extension unit of claim 5 wherein said first side wall includes a floor extension portion, said floor extension extending out of said floor in the deployed position.

19. An extension unit for a structure, the structure having a exterior wall and said extension unit providing additional interior space for the structure in a deployed position, said extension unit comprising:
- a first wall operatively associated with the exterior wall;
- a second wall operably coupled to said first wall and operatively associated with the exterior wall;
- a pivotal connection linking said first wall to said second wall, said pivotal connection allowing said first and second wall to extend from the structure to create interior space beyond the exterior wall of the structure; and
- biasing means for biasing an edge of said first wall into the exterior wall of the structure in the deployed condition.

20. The extension unit of claim 19 wherein said biasing means biases an edge of said first wall into the exterior wall of the structure in the retracted position.

21. The extension unit of claim 19 wherein said biasing means includes a spring operably coupled to said first side wall.

22. The extension unit of claim 19 further comprising a floor having a deployed and retracted position, and a drive shaft operably coupled to said floor.

23. The extension unit of claim 22 wherein said first side wall includes a floor extension portion, said floor extension portion extending out of said floor in the deployed position.

24. The extension unit of claim 22 wherein said drive shaft carries a motor, said motor connected to the structure to move said floor relative to the structure.

25. The extension unit of claim 19 further comprising a roof having a hinged portion and a slidable portion, said roof extendable between a deployed and retracted position.

26. The extension unit of claim 25 wherein said slidable portion is operably coupled to a guide rail within the structure.

27. The extension unit of claim 25 wherein said hinged portion includes a seal which abuts said slidable portion in the deployed position.

28. The extension unit of claim 19 wherein said pivotal connection includes sealing means for forming a seal along said pivotal connection in both of the deployed position and the retracted position.

29. An extension unit for a structure, the structure having a exterior wall and said extension unit providing additional interior space for the structure in a deployed position, said extension unit comprising:
- a first wall operatively associated with the exterior wall;
- a second wall operably coupled to said first wall and operatively associated with the exterior wall;
- a pivotal connection linking said first wall to the exterior wall, said pivotal connection allowing said first and second wall to extend from the structure to create interior space beyond the exterior wall of the structure; and
- biasing means for biasing an edge of said first wall into said second wall in the deployed condition.

30. The extension unit of claim 29 wherein said biasing means biases an edge of said first wall into said second wall in the retracted position.

31. The extension unit of claim 29 wherein said biasing means includes a spring operably coupled to said first side wall.

32. The extension unit of claim 29 further comprising a floor having a deployed and retracted position, and a drive shaft operably coupled to said floor.

33. The extension unit of claim 32 wherein said first side wall includes a side floor portion, said side floor portion extending out of said floor is the deployed position.

34. The extension unit of claim 32 wherein said drive shaft carries a motor, said motor connected to the structure to move said floor relative to the structure.

35. The extension unit of claim 29 further comprising a roof having a first hinged portion and a second slidable portion, said roof extendable between a deployed and retracted position.

36. The extension unit of claim 35 wherein said second slidable portion is operably coupled to a guide rail within the structure.

37. The extension unit of claim 35 wherein said first hinged portion includes a seal which abuts said second slidable portion in the deployed position.

38. The extension unit of claim 29 wherein said pivotal connection includes sealing means for forming a seal along said pivotal connection in both of the deployed position and the retracted position.

39. An extension unit for a structure, the structure having a exterior wall and said extension unit providing additional interior space for the structure in a deployed position, said extension unit comprising:
- a plurality of movable walls, a first one of said walls movable to a position which is disposed at an angle relative to the exterior wall of the structure, said plurality of walls defining a polygonal region in the deployed position; and
- a floor with a planar surface attached to one of said plurality of walls;
- said first wall including a wall portion and a floor extension portion, said floor extension portion extending transversely from said wall portion, said floor extension portion and said planar surface defining separate, non-coextensive surfaces within said polygonal region, said floor extension portion is generally triangularly shaped.

40. The extension unit of claim 39 wherein said floor extension portion further includes an arced edge surface.

41. The extension unit of claim 39 wherein said wall portion further includes a track with a biasing mechanism, said floor extension portion engaged with said track and movable to a position approximately coplanar with said planar surface.

* * * * *